(12) United States Patent
Zhou et al.

(10) Patent No.: US 9,798,037 B2
(45) Date of Patent: Oct. 24, 2017

(54) COMPENSATED SIGMA FROM MEASUREMENTS MADE BY A PULSED NEUTRON INSTRUMENT

(71) Applicant: Schlumberger Technology Corporation, Sugar Land, TX (US)

(72) Inventors: Tong Zhou, Sugar Land, TX (US); Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/424,396

(22) PCT Filed: Sep. 5, 2013

(86) PCT No.: PCT/US2013/058131
§ 371 (c)(1),
(2) Date: Feb. 26, 2015

(87) PCT Pub. No.: WO2014/039599
PCT Pub. Date: Mar. 13, 2014

(65) Prior Publication Data
US 2015/0247948 A1    Sep. 3, 2015

Related U.S. Application Data

(60) Provisional application No. 61/697,178, filed on Sep. 5, 2012.

(51) Int. Cl.
*G01V 5/10*    (2006.01)

(52) U.S. Cl.
CPC .............. *G01V 5/108* (2013.01); *G01V 5/101* (2013.01); *G01V 5/102* (2013.01); *G01V 5/105* (2013.01)

(58) Field of Classification Search
CPC ..................................................... G01V 5/108
See application file for complete search history.

(56) References Cited

U.S. PATENT DOCUMENTS

| 4,600,838 A | 7/1986 | Steinman et al. |
| 4,721,853 A | 1/1988 | Wraight |

(Continued)

FOREIGN PATENT DOCUMENTS

| RU | 2199010 C2 | 2/2003 |
| WO | 2014039599 A1 | 3/2014 |

OTHER PUBLICATIONS

International Search Report for International Application No. PCT/US2013/058131 dated Dec. 19, 2013.

*Primary Examiner* — David Porta
*Assistant Examiner* — Faye Boosalis
(74) *Attorney, Agent, or Firm* — Michael Dae (57) ABSTRACT

A method for determining a formation thermal neutron decay rate from measurements of radiation resulting from at least one burst of high energy neutrons into formations surrounding a wellbore includes determining a first apparent neutron decay rate in a time window beginning at a first selected time after an end of the at least one burst, a second apparent decay rate from a time window beginning at a second selected time after the burst and a third apparent decay rate from a third selected time after the burst. The second time is later than the first time. A thermal neutron capture cross section of fluid in the wellbore is determined. A decay rate correction factor is determined based on the first and second apparent decay rates and a parameter indicative of the wellbore capture cross-section. The correction factor is applied to the third apparent decay rate to determine the formation thermal neutron decay rate.

20 Claims, 7 Drawing Sheets

(56) References Cited

U.S. PATENT DOCUMENTS

| | | | |
|---|---|---|---|
| 4,926,044 | A | 5/1990 | Wraight |
| 5,699,246 | A | 12/1997 | Plasek et al. |
| 6,703,606 | B2 | 3/2004 | Adolph |
| 7,166,834 | B2 | 1/2007 | Gilchrist et al. |
| 7,408,150 | B1 | 8/2008 | Flaum et al. |

FIG. 10B

COMPENSATED SIGMA FROM MEASUREMENTS MADE BY A PULSED NEUTRON INSTRUMENT

BACKGROUND

This disclosure relates generally to the field of pulsed neutron well logging instruments. More specifically, the disclosure relates to methods for obtaining values of compensated neutron capture cross section (sigma) from such instruments.

Formation neutron capture cross section (sigma) measurement based on measurements from a pulsed neutron well logging instrument having capture gamma ray detectors disposed at axially spaced apart locations from a pulsed neutron generator (PNG) has been used in the oil and gas exploration and production industry for several decades. Such measurements may be referred to as "thermal neutron die-away measurements", and they are related to the determination of the macroscopic thermal neutron capture cross section of the formation. The decay of the thermal neutron population after a "burst" of high energy (in the one million electron volt and above energy range) neutrons from the PNG is close to exponential in an ideal situation (for example, a homogeneous uniform medium surrounding the measuring instrument), while the actual neutron population decay cannot be represented by an analytic formula. An apparent decay constant (based on either a curve fitting or moments method) is not always representative of the "intrinsic" formation "decay constant", which is inversely proportional to the macroscopic thermal neutron capture cross section (sigma) of the formation surrounding a wellbore from within which measurements are usually made. Wellbore decay contamination of the measured neutron population and thermal neutron diffusion affect the apparent decay constant. Under some conditions, for example, salty (i.e., high chloride content) fluid in the wellbore and values of sigma of the formation much smaller than sigma of the wellbore fluid, at least two decay constants can be observed in the measured neutron population with respect to time from the end of a neutron burst, and the decay of the thermal neutron population is very close to a dual exponential decay. However, such dual exponential decay is not always clearly identifiable in the neutron population data. An accurate and precise formation sigma determination from pulsed neutron capture measurements under substantially all conditions and with minimal correction for the wellbore environment is a challenging technical problem.

SUMMARY

A method according to one aspect for determining a formation thermal neutron decay rate from measurements of at least one of thermal neutrons and capture gamma rays resulting from imparting at least one controlled duration burst of high energy neutrons into formations surrounding a wellbore includes determining a first apparent decay rate of thermal neutrons in a time window beginning at a first selected time after an end of the at least one burst. A second apparent decay rate of thermal neutrons is determined in a time window beginning at a second selected time after the end of the at least one burst. The second selected time is later than the first selected time. A third apparent decay rate of thermal neutrons is determined in a time window beginning at a third selected time after the end of the at least one burst. A thermal neutron capture cross section of fluid in the wellbore is determined. A decay rate correction factor is determined based on the first and second apparent decay rates and a parameter indicative of the wellbore capture cross section. The decay rate correction factor is applied to the third apparent decay rate to determine the formation thermal neutron decay rate.

Other aspects and advantages will be apparent from the description and claims which follow.

DETAILED DESCRIPTION

Figure 1:
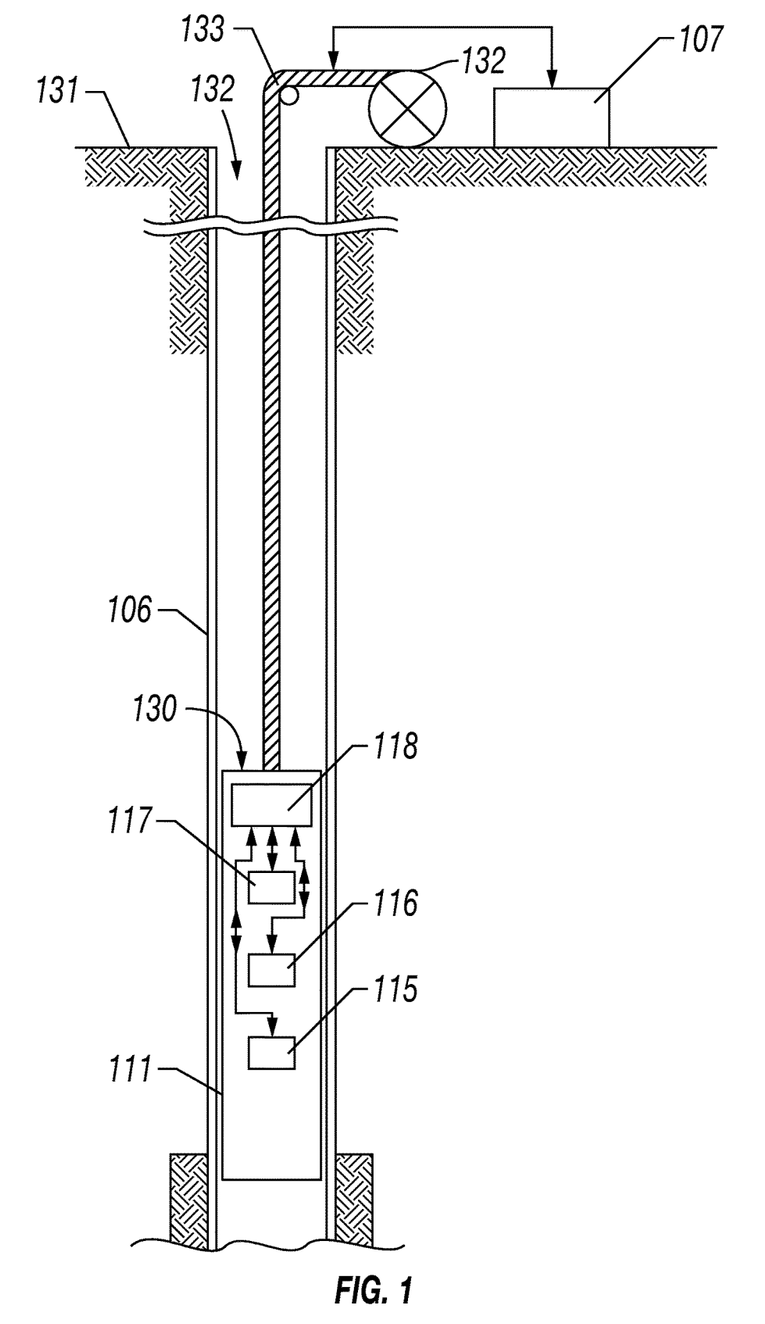
FIG. 1 shows an example wireline conveyed pulsed neutron well logging instrument.

FIG. 1 shows an example apparatus for evaluating subsurface formations 131 traversed by a wellbore 132. The wellbore 132 is typically, but not necessarily filled with a drilling fluid or "drilling mud" which contains finely divided solids in suspension. Deposits of mud solids may deposit on the walls of permeable formations in the wellbore 132 to form mudcake 106. A pulsed neutron logging instrument 130 may be suspended in the wellbore 32 on an armored electrical cable 133, the length of which substantially determines the relative depth of the instrument 130. As is known in the art, this type of instrument can also operate in a well having casing or tubing inserted therein. The length of cable 133 is controlled by suitable means at the surface such as a drum and winch mechanism 134. The depth of the instrument 130 within the wellbore 132 can be measured by encoders in an associated sheave wheel 133, wherein the double-headed arrow represents communication of the depth level information to the surface equipment. Surface equipment, represented at 107, can be of conventional type, and can include a processor subsystem and recorder, and communicates with the all the downhole equipment. It will be understood that processing can be performed downhole and/or at the surface, and that some of the processing may be performed at a remote location. Although the instrument 130 is shown as a single body, the instrument 130 may alternatively comprise separate components such as a cartridge, sonde or skid, and the tool may be combinable with other logging tools. The pulsed neutron well logging instrument 130 may, in a form hereof, be of a general type described for example, in U.S. Pat. No. 5,699,246. The instrument 130 may include a housing 111 in the shape of a cylindrical sleeve, which is capable, for example, of running in open wellbore, cased wellbore or production tubing. Although not illustrated in FIG. 1, the instrument 130 may also have an eccentering device, for forcing the instrument 130 against the wall of an open wellbore or against wellbore casing. At least one pulsed neutron generator (PNG) 115 may be mounted in the housing 111 with a near-spaced radiation detector 116 and a far-spaced radiation detector 117 mounted longitudinally above the PNG 115, each at a separate axial distance therefrom. One or more further detectors (not shown) can also be provided, it being understood that when the near and far detectors are referenced, use of further detectors can, whenever suitable, be included as well. Also, it can be noted that a single radiation detector could be used. Acquisition, control, and telemetry electronics 118 serves, among other functions, to control the timing of burst cycles of the PNG 115, the timing of detection time gates for the near 116 and far 117 radiation detectors and to telemeter count rate and other data using the cable 133 and surface telemetry circuitry, which can be part of the surface instrumentation 107. The surface processor of surface instrumentation 107 can, for example, receive detected thermal neutron counts, detected epithermal neutron counts and/or gamma ray spectral data from near and far radiation detectors 116 and 117. The signals can be recorded as a "log" representing measured parameters with respect to depth or time on, for example, a recorder in the surface instrumentation 107. The radiation detectors may include one or more of the following types of radiation detectors, thermal neutron detectors (e.g., $^3$He proportional counters), epithermal neutron detectors and scintillation counters (which may or may not be used in connection with a spectral analyzer).

The foregoing well logging components can also be used, for example, in logging-while-drilling ("LWD") equipment. As shown, for example, in FIG. 2, a platform and derrick 210 are positioned over a wellbore 212 that may be formed in the Earth by rotary drilling. A drill string 214 may be suspended within the wellbore and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. Alternatively, the drill string 214 and drill bit 216 may be rotated from the surface by a "top drive" type of drilling rig.

Figure 2:
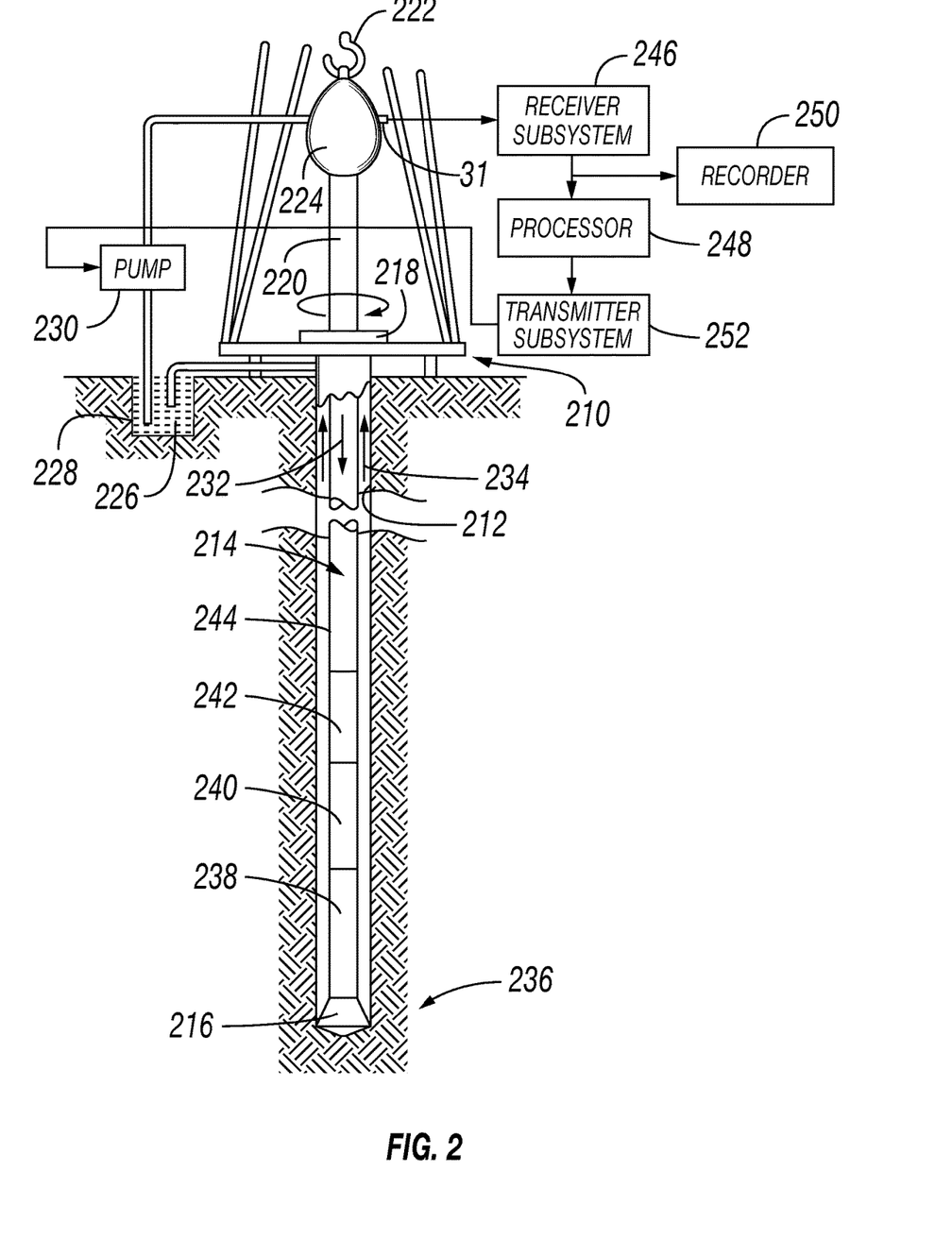
FIG. 2 shows a while drilling pulsed neutron well logging instrument.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, preferably near the drill bit 216. The BHA 236 may include subassemblies for making measurements, processing and storing information and for communicating with the Earth's surface. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions.

In the arrangement shown in FIG. 2, the components of a downhole pulsed neutron measurement subassembly that may be located in the drill collar section 240 above the stabilizer collar 238. Such components could, if desired, be located closer to or farther from the drill bit 216, such as, for example, in either stabilizer collar section 238 or 242 or the drill collar section 244. The drill collar section 240 may include one or more radiation detectors (not shown in FIG. 2) substantially as explained with reference to FIG. 1.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly 236. The recorder 250 may include devices for recording and/or displaying data acquired by the instruments in the wellbore and data processed as will be explained below.

The BHA 236 may also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. Alternatively, the data may be stored downhole and retrieved at the surface upon removal of the drill string. Power for the LWD instrumentation may be provided by battery or, as known in the art, by a turbine generator disposed in the BHA 236 and powered by the flow of drilling fluid.

While the illustrated examples in FIGS. 1 and 2 show a wellbore that does not include a pipe or casing therein (in "open hole"), it is within the scope of the present disclosure for the well logging instrument to be used in wellbores having pipe or casing therein ("cased hole").

Figure 3:
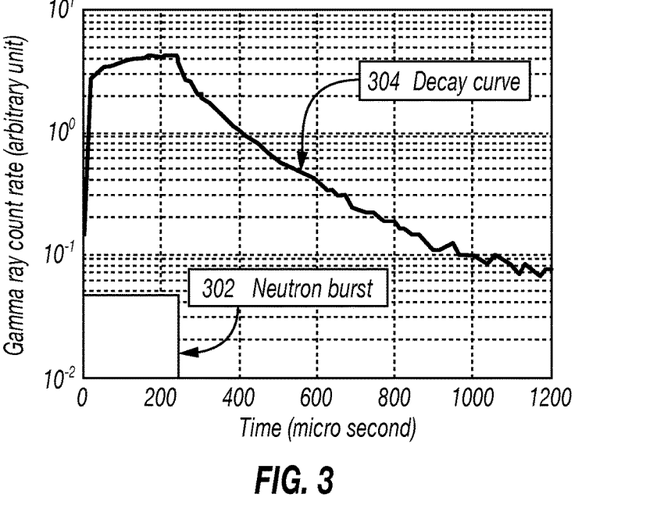
FIG. 3 shows a typical neutron pulsing scheme and neutron population during and after each neutron pulse or burst.

Having shown example instruments for making measurements to be used in embodiments of a method for determining sigma, examples of such methods will now be explained. A typical neutron pulsing scheme and neutron population is shown in FIG. 3. The neutron generator is repeatedly turned on for a certain period and then off for another period. The example in FIG. 3 has a 240 microsecond (μs) long burst "on" time, shown by neutron burst 302 and an almost 1 millisecond long after-burst "off" time. The time decay spectrum, shown at curve 304, during the after-burst off time corresponds to thermal neutron decay, which can be used to measure formation sigma. The neutron burst pulsing scheme may be different from the present example (e.g., "dual burst" as explained in U.S. Pat. No. 4,926,044; "multi-burst" as explained in U.S. Pat. No. 6,703,606). As long as a neutron measurement decay curve, e.g., at 304, is available it may be used for the formation sigma measurement. The detector(s) (see FIG. 1) in the present example may be scintillation-type gamma ray detectors, which measure the gamma rays induced by thermal neutron capture during the after-burst off time. Measurement of such gamma rays is an indirect measurement of the thermal neutron population around the well logging instrument. The principle of the present example may also be applied to thermal neutron detectors (e.g., $^3$He proportional counters as explained with reference to FIGS. 1 and 2). The use of one or more gamma ray detectors may be preferred over using thermal neutron detectors due to their higher count rates and associated better statistical precision.

In some examples, one may use the moments method to compute the apparent decay constant from a count rate curve such as 304 in FIG. 3. If the decay curve has a single exponential decay constant, the first order moment is equal to the decay constant, as shown in Equation 1.

$$x = \frac{\int_0^\infty t \cdot e^{-\frac{t}{x}} \cdot dt}{\int_0^\infty e^{-\frac{t}{x}} \cdot dt} \quad (1)$$

In Equation 1, x is the exponential decay constant and t is the time variable. As a practical matter, the decay curve is not single decay constant exponential curve. The decay curve is not measured up to infinite time from the end of the neutron bursts, but can only be measured during a finite time range. Equation 2 may be used to compute the first order moment, $\tau_1$.

$$\tau_1 = \frac{\int_{t_0}^T (t - t_0) \cdot f(t) \cdot dt}{\int_{t_0}^T f(t) \cdot dt} \quad (2)$$

In Equation 2, f(t) is the measured decay curve (time spectrum of the detector count rate), $t_0$ is the starting time of the moment and T is the stop time of the moment. Because the integral in Equation 2 is not taken from zero to infinity, even if f(t) were a perfect exponential decay curve, $\tau_1$ is not equal to the decay constant of such curve. In order to make them equal, one may perform a correction for the finite integral, which is shown in Equation 3.

$$\text{Finite\_corr} = 1 - 8 \cdot \left(\frac{T - t_0}{\tau_1}\right)^3 \quad (3)$$

The correction provided by Equation 3 is an approximation. A theoretical correction may be provided in other examples by iterative methods. The apparent thermal neutron decay rate [tau (τ)] then can be computed as the ratio of $\tau_1$ and the finite integral correction term, as shown in Equation 4.

$$\tau = \frac{\tau_1}{\text{Finite\_corr}} \quad (4)$$

The apparent sigma (Σ) can be computed using Equation 5.

$$\Sigma = \frac{4545}{\tau} \quad (5)$$

The apparent tau is a function of the starting time ($t_0$) and end time (T) of the time interval (gate) used in the foregoing integral equations. Varying the starting time will not only change the wellbore and diffusion effect in the apparent tau, but will also change the statistical precision. An apparent tau computed using the above equations and with an early starting time may be expected to have more wellbore and diffusion effect than one with a later starting time, because, as explained above, wellbore decay and diffusion typically occur early after the end of the neutron burst and formation decay tends to occur at later times after the end of the neutron burst. Varying the gate end time will only change the statistical precision due to the presence of activation background radiation, which should be subtracted from the overall count rate data before determining the decay constant.

It is known in the art to optimize the timing gate (both starting time and end time) to achieve better precision and reduce the wellbore contamination and diffusion effect. However, the wellbore contamination and diffusion effect cannot be eliminated by only optimizing the timing gate. A feature of the present example includes computing two (or more) apparent decay constants based on different timing gates and compensating the wellbore and diffusion effects completely.

Figure 4A:
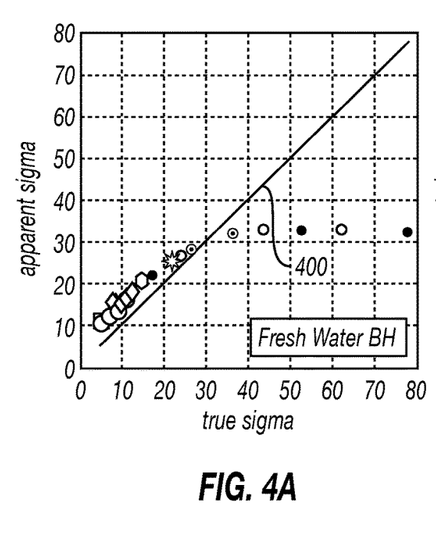
FIGS. 4A and 4B show a formation sigma measurement from an apparent sigma with a linear correction term based on the apparent sigma itself for a fresh water filled wellbore and a wellbore filled with 250 kppm salt water.
Figure 4B:
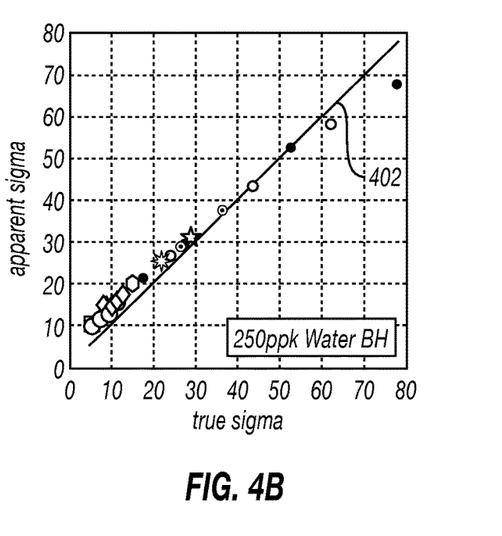

FIGS. 4A and 4B show, respectively, two cross-plots of the apparent sigma with respect to the true formation sigma in various formation conditions and wellbore conditions (e.g., connate fluid salinity, and formation porosity and lithology). The apparent sigma is based on a timing gate starting 130 μs after the end of the neutron burst using the pulsing scheme shown in FIG. 3. The data were computed using a Monte Carlo method (MCNP) in a simulated 12 inch diameter wellbore with a 9.625 inch outer diameter (OD) casing disposed in the example wellbore. The casing inner diameter (ID) was 8.535 inches. FIG. 4A shows the results for a fresh water wellbore, and FIG. 4B shows results for a salt water (250 ppk) filled wellbore. Thirty six different formations were modeled: sandstone, limestone and dolomite with 0-p.u. (p.u. represents "porosity units" or percent porosity), 2.5-p.u., 5-p.u., 10-p.u., 20-p.u., and 40-p.u. fresh water; sandstone 10-p.u., 20-p.u., 40-p.u. and 60-p.u. salt water (100 ppk, 200 ppk and 260 ppk); 0-p.u. anhydrite, H&H shale (dry clay based on core sample analysis), 10% dry clay plus 90% sand, 20% dry clay plus 80% sand, and 100-p.u. fresh water.

As shown in FIG. 4A, in the fresh water-filled wellbore, the apparent sigma is approximately equal to a constant plus the true sigma when the true sigma is less than about 25 capture units (c.u.). When the true sigma is more than 25 c.u., the apparent sigma becomes saturated and dramatically diverges from the true sigma. The foregoing is indicated by data point deviation from line 400. The foregoing deviation is caused by the fact that the formation sigma is higher than the wellbore sigma. In this case, the formation decay is fast and occurs early, while the wellbore decay is slow and occurs late. A relatively late gate starting time (130 μs) does not effectively measure the formation decay, but measures the wellbore decay plus the effect of neutron diffusion from the wellbore to the formation, giving erroneous values of tau. This is the so-called "crossover" condition, which in the present context means the formation and wellbore decay cross over in apparent decay time. In the salt water-filled wellbore, as shown in FIG. 4B, the apparent sigma is well-ordered and almost equal to a constant plus the true sigma, as shown by the data points closely following line 402. There are few crossover conditions because the wellbore sigma is higher than the formation sigma. It should be noted that there is not a clear distinction between crossover and non-crossover conditions.

In non-crossover conditions, the correction for the apparent sigma is small (within 5 c.u.). Therefore, it is relatively easy to have a formation sigma measurement from the apparent sigma with a linear correction term based on the apparent sigma itself. However, such linear correction will not be exact. For example, 0-p.u. anhydrite will have a 3 to 4 c.u. error, and 0-p.u. sandstone will have a 2 to 3 c.u. error, as shown in FIG. 4B. Such errors are a function of lithology (formation mineral composition) and porosity. Although the values of these errors are not very large in absolute terms, they are very large in percentage terms (up to 50% for 0-p.u. sandstone). Thus, it is difficult to have an accurate formation sigma measurement with an error smaller than 1 c.u. that is independent of lithology and porosity. Another difficulty is the presence of the crossover condition.

Figure 5A:
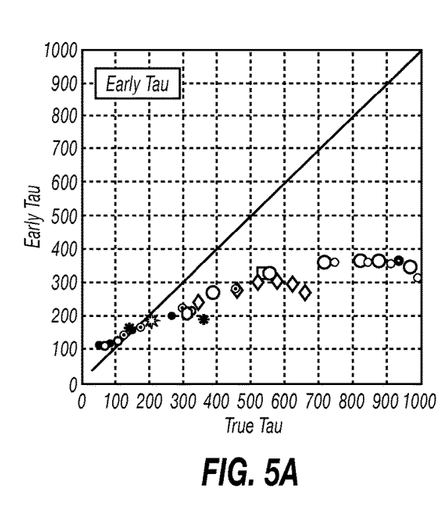
FIGS. 5A and 5B show two apparent taus with two different starting times versus the true formation tau: one apparent tau is determined starting right after the end of the neutron burst (FIG. 5A), the other starts 130 μs after the end of neutron burst FIG. 5B.
Figure 5B:
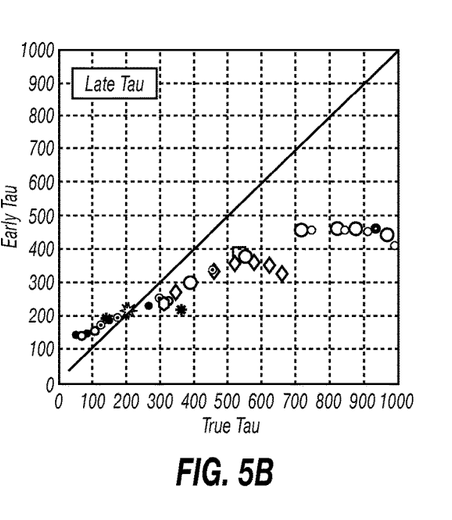

In order to overcome the two difficulties described above, the present example provides a method to compensate the apparent tau using the difference between two apparent taus, each computed from a measurement gate having a different starting time from the end of the neutron burst. FIGS. 5A and 5B show two apparent taus with two different gate starting times with respect to the true formation tau: one apparent tau is determined using a timing gate starting at the end of the neutron burst (early tau, FIG. 5A), the other uses a timing gate starting 130 μs after the end of neutron burst (late tau, FIG. 5B). The wellbore and formation conditions are the same as those used to generate the data shown in FIGS. 4A and 4B, except that the wellbore fluid for both FIGS. 5A and 5B is fresh water. The apparent and true tau in FIG. 5B can be converted to the apparent and true sigma in FIG. 4A using Equation 5. The percentage correction for apparent tau is the same as the percentage correction for the apparent sigma, but the absolute corrections are quite different. For example, the 0-p.u. sandstone has the largest tau (1000 μs) and smallest sigma (4.55 c.u.). The difference between the true tau and apparent tau is 600 μs for the late tau, and the difference between the true sigma and the apparent sigma is 6.8 c.u.

As can be observed in FIGS. 5A and 5B, there are lithology effects in the apparent tau, particularly for high tau values (low sigma values). For example, fresh water filled limestone with porosity lower than 5 p.u. will not be on the same line as sandstone or dolomite. Another example is 0-p.u. anhydrite. In addition, the apparent tau does not monotonically increase with respect to the true tau. Above 500 μs, the apparent tau can drop (depending on lithology and porosity) with increasing true tau. The correction should take this fact into account in order to obtain good accuracy. Both the early and late tau have similar lithology effects and behave similarly with respect to lithology. However, there are differences between the two. The late tau is closer to the true tau than the early tau. The difference between the early and late values of tau may be used to compensate the apparent tau in order to compute the true tau.

Figure 6A:
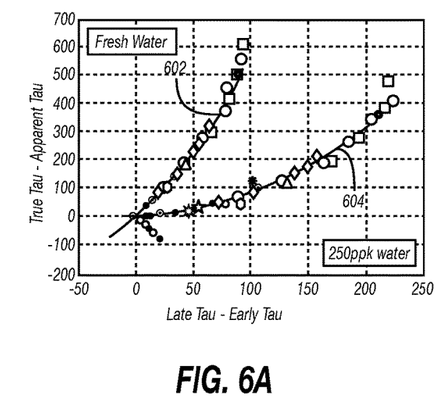
FIGS. 6A and 6B show the difference between the true tau and an apparent tau (correction term for the apparent) versus the difference between the early and late tau. The timing gates used in the early and late tau are the same as the ones in FIGS. 5A and 5B.
Figure 6B:
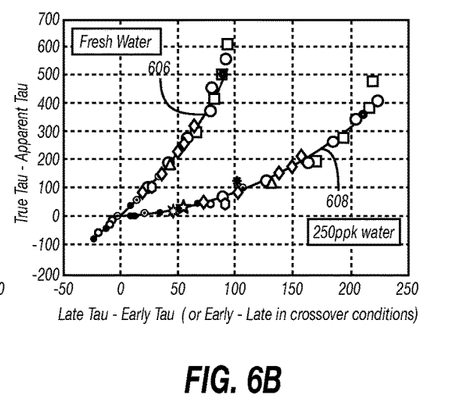

FIGS. 6A and 6B show the difference between the true tau and a third apparent tau with respect to the difference between the early (first) and late (second) tau ($\Delta\tau$). The timing gates used in the early and late tau are the same as the ones shown in FIGS. 5A and 5B. The third apparent tau to which a "tau correction" (or compensation, explained below) may be applied can be computed based on any timing gate, while in the present case it may be the same as the late tau. The wellbore and formation conditions are the same as ones used to generate the data shown in FIGS. 4A and 4B. As can be observed in FIG. 6A, the correction term for the apparent tau can be predicted very well based on a second order polynomial fit, indicated by curves 602 and 604, for non-crossover conditions if the wellbore fluid is known. Here one may define the crossover condition as when the difference between the true tau and the apparent tau is less than zero. FIG. 6A shows that the polynomial fit, curve 604 does not predict the data points below zero at all. Recall that in crossover conditions the wellbore decay occurs late while the formation decay occurs early. Thus, one may compute $\Delta\tau$ to be the late tau minus the early tau in non-crossover conditions, and in crossover conditions $\Delta\tau$ is equal to the early tau minus the late tau. One may plot the difference, either visually on a display or printed graph or in the processor (see FIG. 2) between true tau and apparent tau versus $\Delta\tau$ in FIG. 6B. As can be observed at curves 606 and 608, the polynomial fit determined from the foregoing simulations can be used to predict a correction term very well for a wide range of wellbore and formation conditions. The foregoing correction may be referred to as the "tau correction." The tau correction is substantially independent of lithology and porosity. The tau correction may be implemented, for example, using a predetermined polynomial expression or a lookup table. Other implementations will occur to those skilled in the art. In the present example, the value of the tau correction is related to the arithmetic difference between the late tau and the early tau, however for purposes of defining the scope of the disclosure, any relationship that depends on the values of early tau and late tau may be used, for example and without limitation, a ratio of early tau to late tau (or its inverse), difference between logarithms of the two tau values and difference between the tau values wherein each tau value is multiplied by a corresponding constant.

The selection of the timing gates for the three apparent taus represents a trade-off between accuracy and precision. Generally speaking, one should select the early timing gate for the early tau as early as possible (e.g., at the end of the neutron burst) and the late timing gate for the late tau as late as possible to minimize the correlation between the two. The smaller the correction is, the better the accuracy and precision of the tau correction are. The earliest timing gate is right after the neutron burst, which also gives the best precision for the apparent tau because it is using all the data in the decay curve. On the other hand, the precision of the apparent tau will degrade as the timing gate becomes later because it is using less data in the decay curve. The selection of the third timing gate for the third apparent tau can be optimized. An early timing gate will give better precision for the third apparent tau, but it requires a larger tau correction term to obtain the true formation tau, which is not preferred in term of accuracy. A late timing gate will require a smaller tau correction term, however, it will provide lower statistical precision for the third apparent tau.

To illustrate the tau correction in a wellbore which has a different configuration (such as wellbore diameter or casing size) than the one used in FIGS. 6A and 6B, FIGS. 10A and 10B show the modeling results in a 8-inch wellbore with a 5.5-inch OD casing (4.94-inch ID). Since the wellbore effects and diffusion effects in different wellbore configurations are different, the function which may be used to determine tau correction based on $\Delta \tau$ becomes different. However, the general formula may still be the same, which in the present example is a second order polynomial fit, indicated by the solid lines 1000 and 1002 in FIG. 10A and 1004 and 1006 in FIG. 10B. The only thing changed from one wellbore configuration to another are the coefficients of the polynomial function. Therefore, one can calibrate the coefficients in various wellbore configurations and then determine the coefficients for any wellbore configuration based on the calibrated ones by, e.g., interpolation, lookup table, or an analytic function.

A more detailed inspection of FIGS. 6A, 6B, 10A and 10B shows that the curve for high wellbore salinity is almost unaffected by the change in wellbore size, while the curve for the fresh water-filled wellbore has moved much closer to the 250-ppk curve. This illustrates that the principal effects of casing and cement results from the wellbore fluid. Reducing the volume of the wellbore fluid in smaller casing leads to a corresponding, and frequently large reduction in the wellbore fluid effect. It may therefore be possible to use a simple analytic function to describe the magnitude of the correction as a function of the wellbore parameters. In the case of high wellbore salinity the correction may be substantially independent of the wellbore geometry.

The foregoing modeling results used to verify the functionality of the present example method were based on a wellbore having a casing therein, as explained with reference to FIGS. 4A and 4B. It should be clearly understood that the present example method may be equally useful in wellbores having no casing therein ("open hole"). The presence or absence of casing is not a limitation on the scope of the disclosure.

It should be noted that the tau correction may introduce some statistical noise in the results. Because the tau correction amplitude can be quite large compared to $\Delta \tau$, the noise in $\Delta \tau$ then will be magnified after the correction. A possible solution for the foregoing is to apply an adaptive filter to the tau correction term. Testing showed that in general a 5-level (depth or axial position increment) adaptive filter may be sufficient. Such a filter is not expected to degrade the axial resolution of the measurement to any substantial degree.

There are two data that need to be known in order to perform the above described correction. One datum is the wellbore fluid composition, the other is whether the condition at the position of measurement is crossover or not. In a liquid-filled wellbore (oil or water), the measured wellbore fluid sigma can be used to compute the tau correction. The value wellbore fluid sigma need not be known or determined very accurately. Experiments verified that the sigma accuracy based on this method can be within 1 c.u. using a wellbore sigma value with an uncertainty (1 standard deviation) of about 10 c.u. for non-crossover conditions. The crossover condition requires a wellbore sigma measurement with better accuracy than 10 c.u., and in such cases it may be desirable to measure wellbore fluid sigma There are different ways to measure the wellbore fluid sigma, for example, based on the "dual-burst" model as explained in U.S. Pat. No. 4,926,044. The wellbore fluid sigma can also be determined by a resistivity measurement made on a fluid sample at the surface, or made in the wellbore. The wellbore measurement may be preferably made at the time of the pulsed neutron data acquisition.

Figure 7A:
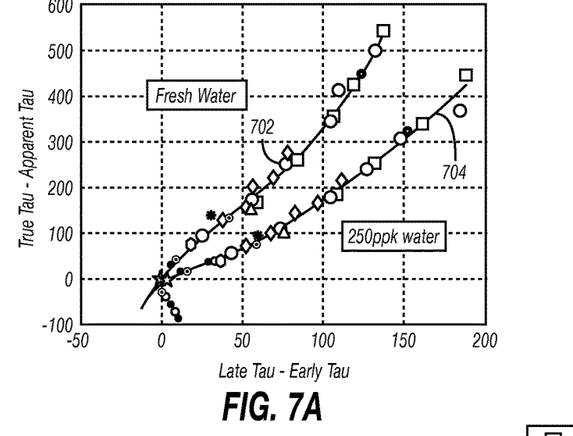
FIGS. 7A and 7B shows how well the tau correction term can be predicted based on the difference between late and early tau.
Figure 7B:
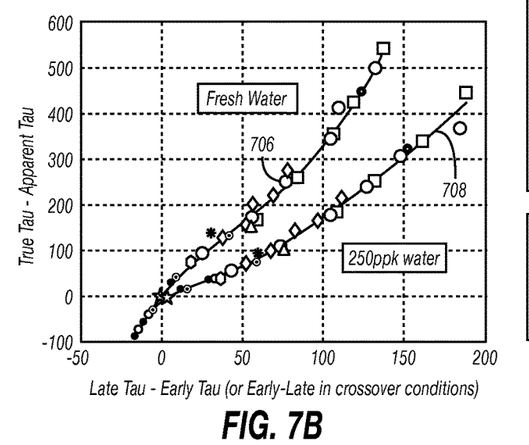

A tau correction plot similar to FIGS. 6A and 6B is shown in FIGS. 7A and 7B. All the apparent decay constants (tau) are computed based on a single exponential fit in various timing gates, which are the same as the timing used to generate the plots shown in FIGS. 6A and 6B. The differences between FIGS. 6A, 6B and FIG. 7A, 7B are due to the different wellbore and diffusion effects on the apparent decay constants, which are computed using the two different above described approaches. However, the same method used in the present example can be used to compensate the apparent tau for both. The solid lines in FIGS. 7A and 7B, 702, 704, 706, 708 show how well the tau correction term can be predicted based on the difference between late and early tau. This example indicates the principle of the present example can be applied to the computed apparent decay constants using any method. A comparison of the results of FIGS. 6A, 6B, to those shown in FIGS. 7A and 7B indicates that in the latter case there is a smaller effect of the wellbore fluid salinity. Therefore, the determination of wellbore sigma can be less accurate without affecting the accuracy of the final answer.

Figure 8:
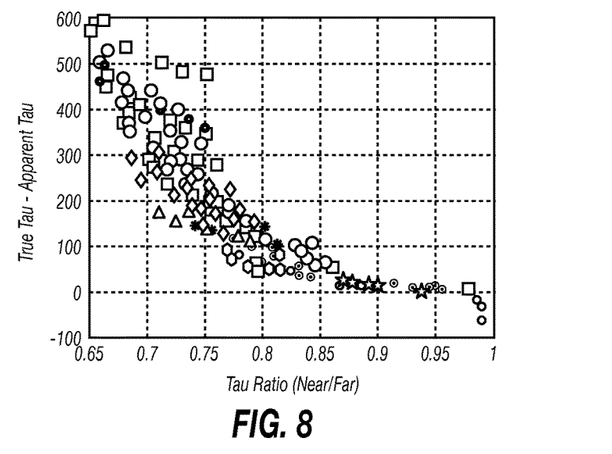
FIG. 8 graphically shows the difference between the true tau and apparent tau versus the tau ratio, which is equal to the ratio between a near and far detector apparent tau.

In order to know whether the existing condition is crossover or not, a crossover indicator may be used, which is related to the ratio between the apparent tau from a near spacing detector and the apparent tau from a far spacing detector (see FIG. 1). This crossover indicator only works for a well logging instrument with two or more detectors with different axial spacings from the neutron source. FIG. 8 shows the difference between the true tau and apparent tau versus the tau ratio, which is equal to the ratio between the near and far detector apparent tau. In this case, the timing gate used in the apparent tau computation is the same as the one for the late tau. However, similar performance can be obtained using other timing gates. The wellbore and formation conditions are the same as the ones used to generate the data shown in FIGS. 4A and 4B, except that there are 6 different wellbore fluids (0 ppk, 50 ppk, 100 ppk, 150 ppk, 200 ppk and 250 ppk sodium chloride concentration in water). As can be observed in FIG. 8, almost all the crossover conditions (below zero) correspond to a tau ratio larger than around 0.96, and almost all non-crossover conditions (above zero) correspond to a tau ratio less than 0.96. Thus, the tau ratio can be used as a crossover indicator to determine the sign of $\Delta \tau$. Additional information can also be used to make the tau ratio a more robust crossover indicator. For example, it is known that crossover means that formation sigma is high and wellbore sigma is low, one may use the apparent formation sigma and wellbore sigma to determine the crossover condition, or to make the tau ratio a more robust indicator.

Figure 9:
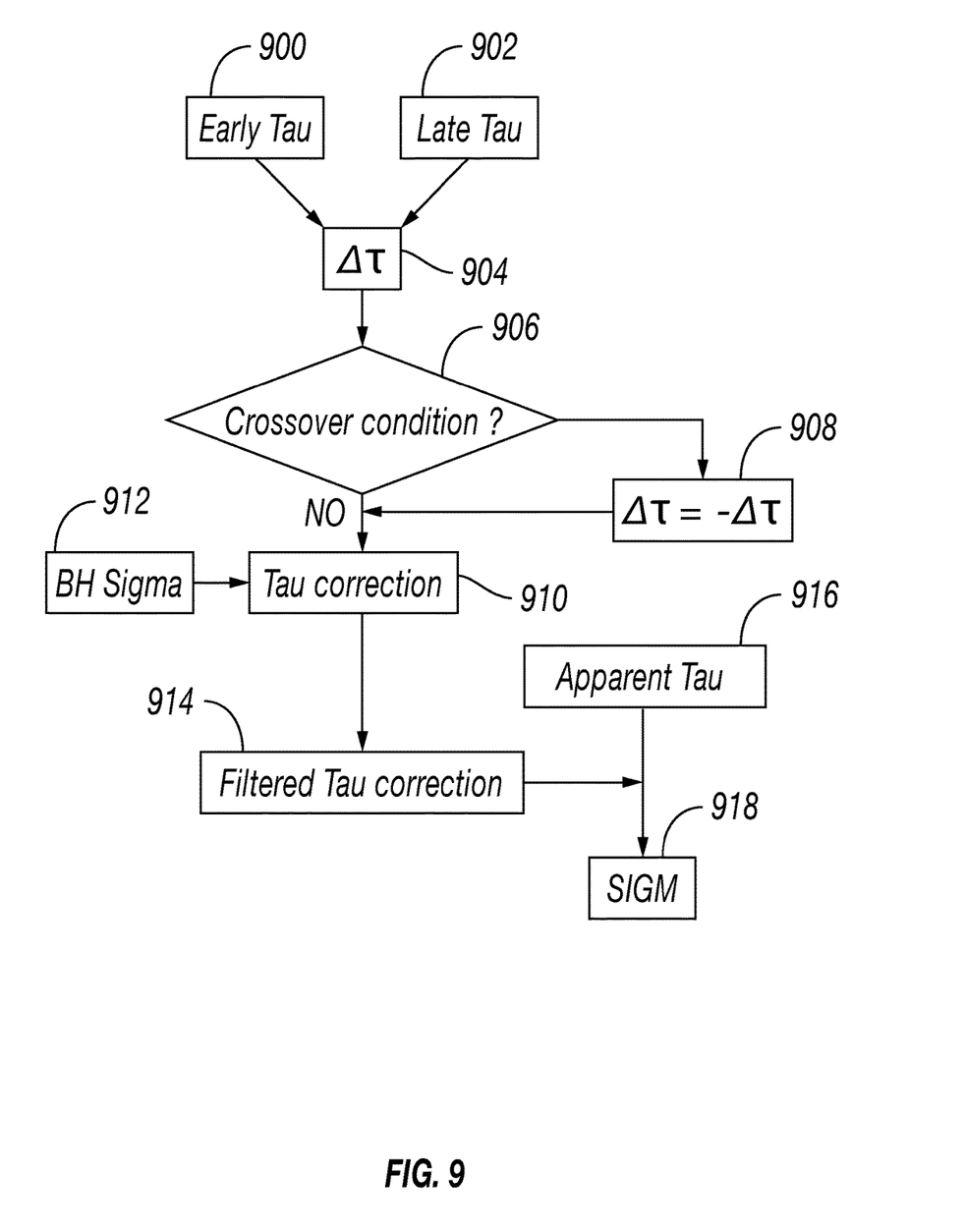
FIG. 9 shows a flow chart of implementing an example method.
Figure 10A:
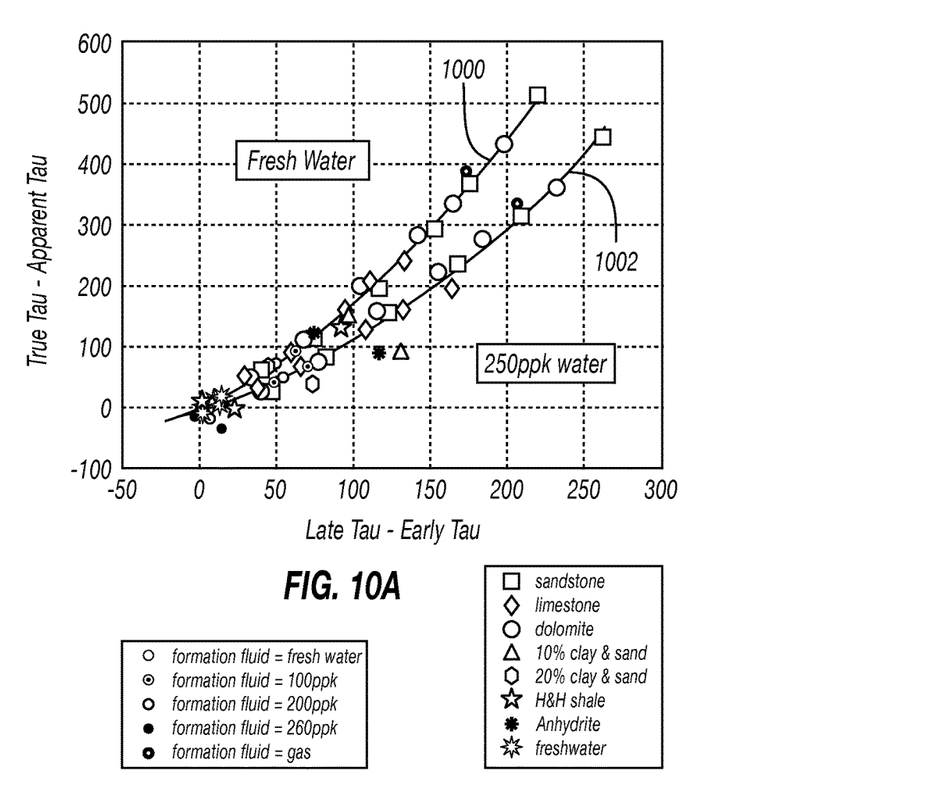
FIGS. 10A and 10B show simulation results similar to those in FIGS. 6A and 6B using a wellbore with different diameter and a casing with different size, therein.
Figure 10B:
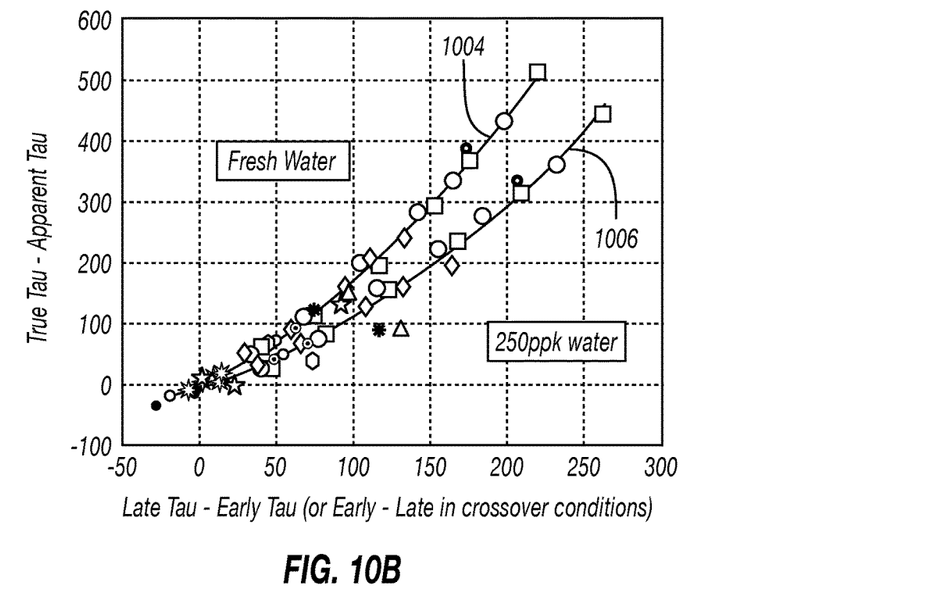

FIG. 9 shows a flow chart of the present example method. At 900, the early tau may be computed using the moment method. At 902, a late tau value may be computed using the moment method. At 904, $\Delta \tau$ is computed, which is equal to late tau minus early tau. At 906, based on the crossover indicator, determine whether the current condition is crossover. If yes, at 908, make Δτ negative of its present value. If not, take no action. At 912, obtain a wellbore sigma measurement. At 910, use the wellbore sigma and Δτ to compute the tau correction. At 914, an adaptive filter may be applied to the tau correction term. At 916, the third apparent tau is computed. The formation tau is computed as the sum of the tau correction and the third apparent tau. At 918, one may compute the formation sigma from the formation tau.

Because sigma and tau can be converted to each other using Equation 5, following the same principle as the described example method, one can readily perform the above described correction in the sigma domain instead of the tau domain. Thus for purposes of defining the scope of the present disclosure, any reference to thermal neutron decay rate may be substituted by a corresponding thermal neutron capture cross section.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   moving a pulsed neutron logging instrument in a wellbore;
   imparting at least one controlled duration burst of high energy neutrons into formations surrounding the wellbore;
   measuring at least one of thermal neutrons and capture gamma rays resulting from said imparting;
   in a processor, determining a first apparent decay rate of thermal neutrons in a time window beginning at a first selected time after an end of the at least one burst;
   in the processor, determining a second apparent decay rate of thermal neutrons in a time window beginning at a second selected time after an end of the at least one burst, the second selected time being later than the first selected time;
   in the processor, determining a third apparent decay rate of thermal neutrons in a time window beginning at a third selected time after an end of the at least one burst;
   in the processor, determining a decay rate correction factor based on the first and second decay rates and a parameter indicative of the wellbore thermal neutron capture cross section;
   in the processor applying the decay rate correction factor to the third apparent decay rate to determine the formation thermal neutron decay rate, wherein the correction factor is based on an arithmetic difference between the first and second decay rates; and
   determining when a crossover condition exists and inverting a sign of the apparent decay rate difference when the crossover condition exists.

2. The method of claim 1 further comprising determining a formation thermal neutron capture cross section from the formation thermal neutron decay rate.

3. The method of claim 1 wherein the radiation detector comprises at least one of a gamma ray detector and a thermal neutron detector.

4. The method of claim 1 wherein the determining when a crossover condition exists comprises determining a ratio of an apparent thermal neutron decay rate based on the first radiation detector and a corresponding thermal neutron decay rate from measurements made by the second radiation detector which has a different spacing from a position of imparting the burst of neutrons than the first radiation detector, the crossover condition determined to exist when the ratio exceeds a selected threshold.

5. The method of claim 1 wherein the determining when a crossover condition exists is done by comparing an apparent formation sigma with the wellbore thermal neutron capture cross section.

6. The method of claim 1 further comprising adaptively filtering the determined decay rate correction factor.

7. The method of claim 1 wherein the parameter indicative of wellbore fluid thermal neutron capture cross section is determined by making a thermal neutron decay rate measurement of the fluid in the wellbore.

8. The method of claim 1 wherein the parameter indicative of wellbore fluid thermal neutron capture cross section is determined by measuring a resistivity of the fluid.

9. The method of claim 1 wherein the third selected time is the same as the first or second selected time.

10. A method for well logging, comprising:
    moving a well logging instrument along an interior of a wellbore drilled through subsurface formations, the instrument including a pulsed neutron source and at least one radiation detector disposed at an axially spaced apart position from the pulsed neutron source;
    operating the pulsed neutron source to emit at least one controlled duration burst of neutrons into the wellbore and the formations;
    detecting radiation related to thermal neutron population using the radiation detector after an end of the at least one burst;
    in a processor, determining a first apparent decay rate of thermal neutrons in a time window beginning at a first selected time after an end of the at least one burst;
    in the processor, determining a second apparent decay rate of thermal neutrons in a time window beginning at a second selected time after an end of the at least one burst, the second selected time being later than the first selected time;
    in the processor, determining a third apparent decay rate of thermal neutrons in a time window beginning at a third selected time after an end of the at least one burst;
    in the processor, determining a thermal neutron capture cross section of fluid in the wellbore;
    in the processor, determining a decay rate correction factor based on the first and second apparent decay rates and the wellbore capture cross-section;
    in the processor applying the correction factor to the third apparent decay rate to determine the formation thermal neutron decay rate, and
    adaptively filtering the determined decay rate correction factor.

11. The method of claim 10 further comprising determining a formation thermal neutron capture cross section from the formation thermal neutron decay rate.

12. The method of claim 10 wherein the radiation detector comprises at least one of a gamma ray detector and a thermal neutron detector.

13. The method of claim 10 wherein the correction factor is based on an arithmetic difference between the first and second apparent decay rates.

14. The method of claim 13 further comprising determining when a crossover condition exists and inverting a sign of the apparent decay rate difference when the crossover condition exists.

15. The method of claim 14 wherein the determining when a crossover condition exists comprises determining a ratio of the second apparent thermal neutron decay rate and a corresponding thermal neutron decay rate from measurements made by a radiation detector having a different spacing from a position of imparting the burst of neutrons than a radiation detector used to determine the second apparent thermal neutron decay rate, the crossover condition determined to exist when the ratio exceeds a selected threshold.

16. The method of claim 14 wherein the determining when a crossover condition exists by comparing an apparent formation sigma with the wellbore thermal neutron capture cross section.

17. The method of claim 10 wherein the wellbore fluid capture cross section is determined by making a thermal neutron decay rate measurement of the fluid in the wellbore.

18. The method of claim 10 wherein the wellbore fluid capture cross section is determined by measuring a resistivity of the fluid.

19. The method of claim 10 wherein the third selected time is the same as the second selected time.

20. A method, comprising:
moving a pulsed neutron logging instrument in a wellbore;
imparting at least one controlled duration burst of high energy neutrons into formations surrounding the wellbore;
measuring at least one of thermal neutrons and capture gamma rays resulting from said imparting;
in a processor, determining a first apparent decay rate of thermal neutrons in a time window beginning at a first selected time after an end of the at least one burst;
in the processor, determining a second apparent decay rate of thermal neutrons in a time window beginning at a second selected time after an end of the at least one burst, the second selected time being later than the first selected time;
in the processor, determining a third apparent decay rate of thermal neutrons in a time window beginning at a third selected time after an end of the at least one burst;
in the processor, determining a decay rate correction factor based on the first and second decay rates and a parameter indicative of the wellbore thermal neutron capture cross section; and
in the processor applying the decay rate correction factor to the third apparent decay rate to determine the formation thermal neutron decay rate;
wherein the third selected time is the same as the second selected time.

* * * * *